(No Model.)
W. WOOLGAR.
ROD OR BOLT CUTTER.
No. 362,137. Patented May 3, 1887.
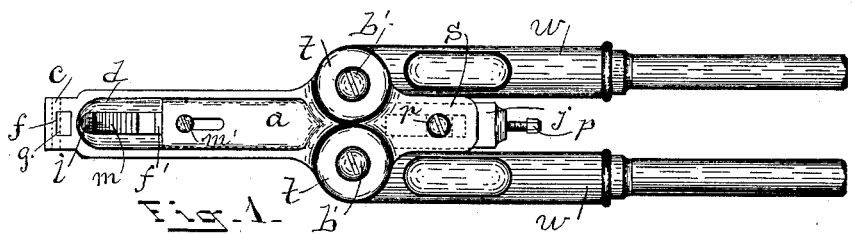
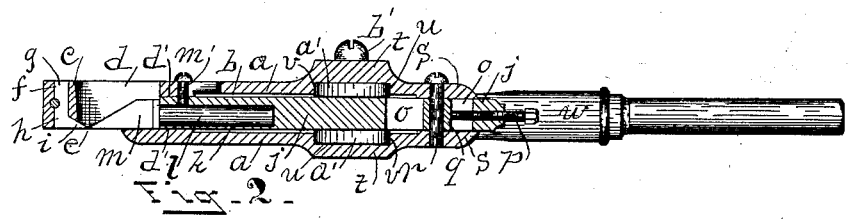
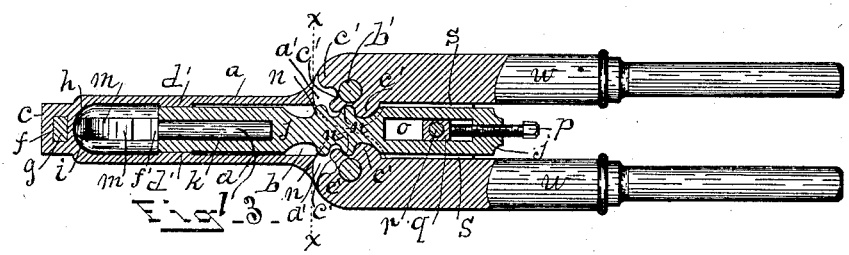
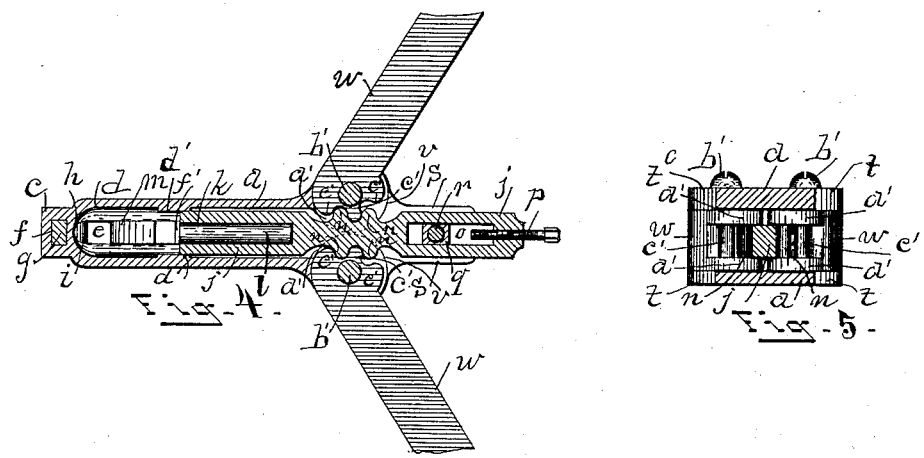
ATTEST:
Frank Dargis
W. H. Power.
INVENTOR:
William Woolgar.
By Jas E Thomas
Atty.

UNITED STATES PATENT OFFICE.

WILLIAM WOOLGAR, OF BAY CITY, MICHIGAN.

ROD OR BOLT CUTTER.

SPECIFICATION forming part of Letters Patent No. 362,137, dated May 3, 1887.

Application filed October 7, 1886. Serial No. 215,526. (No model.)

*To all whom it may concern:*

Be it known that I, WILLIAM WOOLGAR, a citizen of Canada and a subject of Great Britain, residing at Bay City, in the county of Bay and State of Michigan, have invented certain new and useful Improvements in Bolt or Rod Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in that class of bolt or rod cutters which are used chiefly for trimming off the bolt ends which extend beyond the nuts after the nuts are in position, and also for cutting rivets, &c., to a proper length after they are driven; and it relates more especially to that class of bolt or rod cutters in which a stationary cutter is held in position near the end of a holder or head, which also contains a reciprocating cutter carried by a sliding block and meeting the stationary cutter, the reciprocating cutter being propelled by levers which are pivoted to the sides of the holder by one end and provided with teeth on its opposite end, which engage with teeth in the sliding block in a manner that when the free ends of the levers are drawn together the block and cutter is propelled forward; and the invention consists chiefly in forming an improved support for holding the rear end of the sliding block in a proper position and regulating the reciprocating movement of the block, and thereby strengthening the block and lever connections directly where the heavy strain is applied.

Great power and strength of material are required in a machine which is designed to be used in trimming off bolt ends, and as the machine is used by the hands it must be formed to be as light as possible, and the immense strain to which the machine is intermittently subjected by the levers causes the chambers guiding the sliding block to wear away, and the block then, being short and imperfectly supported, sways to one side and causes the cutters to twist and break and cut off the bolt in a rough and uneven form, and the parts soon become so worn away that the the machine has to be thrown aside, no provision being made for renewing any of the parts for repairs without great expense and trouble, so that an entire new machine is the only remedy; and the cutter, being secured in the usual manner by a screw to the sliding block, is imperfectly supported for the heavy work it is designed to perform, and is extremely liable to be torn loose and to be broken, and other forms—as a cutter propelled forward by an adjusting-screw and independent of any support by the block—are in use, but are expensive and not easily replaced when the holder has become worn away so as to allow the cutter to swerve and twist, and these forms of cutters, being pushed forward entirely by the adjusting-screw, are not solid and reliable, as but a small amount of labor is required to cause the screw to become loose and cause great annoyance and trouble; and the objects of my invention are to avoid these troubles and difficulties by producing a device that may be cheaply and easily constructed; that provides a support for the rear end of the sliding block which, when worn away, may be easily replaced, and at a trifling expense; to secure the reciprocating cutter and support the same in a more rigid and substantial manner, and to more firmly support the levers and sliding block in relation to each other and partially independent of the bolts securing the levers in position, and in a manner that the strain of the cutting operation does not fall entirely upon the bolts. The devices I employ to attain these objects are illustrated in the accompanying drawings, in which—

Figure 1 is a plan view of my improved bolt or rod cutter, showing the cutters closed. Fig. is a longitudinal vertical central section of Fig. 1. Fig. 3 is a horizontal central section of the same. Fig. 4 is the same as Fig. 3, with the cutters open. Fig. 5 is a transverse section at *x x*.

*a* represents a casing or holder having a longitudinal chamber, *b*, and provided with a solid front end, *c*, and an upper opening, *d*, and a lower opening, *e*. Vertically through the end $c$ is formed an opening, $f$, within which is placed and secured, by a pin, $f'$, the shank $g$ of a cutter, $h$, the blade or cutting portion $i$ being extended rearward into the opening $e$ at right angles with the shank. Within the chamber $b$, and extending the entire length thereof, is placed the block $j$. The chamber $b$ is slightly contracted at the front end, $d$, so that the block $j$ is free and clear of all bearing in the chamber, except at the point $d'$, so that the portion $d'$ is easily and perfectly fitted to the block.

The front end of the block $j$ is provided with a longitudinal opening, $k$, into which rests the shank $l$ of the cutter $m$, which extends forward into the opening $e$, and meets the edge of the cutter $h$, and is secured in position by a set-screw, $m'$, passed into the block and bearing against the shank. The side edges of the block are provided with the teeth $n$, and in rear of the teeth is arranged a vertical slot, $o$, and passed through the rear end of the block and extending into the slot is the screw-bolt $p$. Within the slot $o$ is placed a block, $q$, and a bolt, $r$, is passed through the rear end, $s$, of the casing $a$, which extends considerably in rear of the point where the levers are attached and through the block $q$.

$t$ are portions of the upper and lower walls of the casing, projecting beyond the sides of the casing, the side walls between the parts $t$, and also between the parts $s$, being cut away, and recesses $u$ are arranged in the chamber, forming the shoulders $v$ on the edges of the recesses, and between the parts $t$ are placed one end of the levers $w$, the inner end of the levers being provided with teeth $c'$, which engage with the teeth $n$ in the block $j$.

Above and below the levers are arranged circular flanges $a'$, which are formed integral with the levers and extend across the upper and lower sides of the block $j$, so that the outer edges of the flanges nearly meet each other, and the bolts $b'$ are passed through the parts $t$ and the flanges $a'$ and the lever $w$.

The flanges $a'$ are constructed to fit into the recess $u$, and the rear edges of the flanges bear against the rear portion of the shoulder $v$, and partially relieve the bolt $b'$ from heavy strain during the bolt-cutting operation. This arrangement of the flanges $a'$ operates to support the block $j$ and levers in relation to each other at the point where the heavy strain of the levers is applied to propel the block forward when cutting the bolt, and also allows the teeth $c'$ to be formed nearer the bolts $b'$, which greatly enhances the power and increases the leverage of the machine, and the block $q$, being at some distance in rear of the teeth $n$, serves to hold the rear end of the block $j$ firmly in position, and prevents the side strain of the levers from wearing away the sides of the rear end of the casing and allowing the block to become loose and unfit for accurate work.

Whenever the block $q$ or the slot $o$ becomes worn, and the sliding-block has more lateral movement than is required, a new block $q$ is quickly and easily fitted to the slot $o$, and the sliding block is then as firm and operates the same as when new. The front end, $b'$, of the chamber is fitted to take up the wear of the chamber and block by closing the portion $d'$ upon the sliding block by a few blows of a hammer, and by these means the sliding block may be, with little trouble or expense, caused to operate true and even, and thereby make the machine much more durable and satisfactory. The cutter $m$ is adjusted forward, when worn away, by removing the cutter from the block and placing one or more washers, $f'$, on the shank. This projects the cutter forward, and the screw $p$ is then adjusted to prevent the cutters from closing against each other when the block is moved forward. This mode of holding the cutter $m$ in position is very strong and reliable, as the shank of the cutter is supported on all sides by solid material, and the shoulders of the cutter, bearing firmly upon the block, prevent any swerving or springing of the cutter when in operation.

What I claim as my invention is—

1. In a bolt-cutter, the combination, with the holder $a$, having the chamber $b$ and the recesses $u$, forming the shoulders $v$, and provided with a cutter, $h$, in its front end, the sliding block $j$, having on its sides the teeth $n$ and provided with the end opening, $k$, a cutter, $m$, having a shank, $l$, secured within the opening $k$, and the levers $w$, pivoted to the holder and provided with the teeth $c'$, engaging with the teeth $n$, of the flanges $a'$, projecting from the pivoted end of the lever within the recesses $u$ and extending over the upper and the lower sides of the sliding block, substantially as and for the purpose herein set forth.

2. In a bolt-cutter, the combination, with the holder $a$, having the chamber $b$ and the recesses $u$ and the shoulders $v$ and provided with a rearward-extending portion, $s$, the cutter $h$ on the front end of the holder, the sliding block $j$ within the chamber and provided with the cutter $m$ on its front end and the teeth $n$ on its sides, and the levers $w$, having on one end the projecting flanges $a'$, resting within the recesses $u$ and pivoted to the holder and provided with the teeth $c'$, engaging with the teeth $n$, of a slot, $o$, in the rear portion of the block $j$, the block $q$ within the slot, the bolt $r$, passing through the part $s$, and the block $q$, and the screw-bolt $p$, passed through the rear end of the block $j$ and extending into the slot, substantially as and for the purpose herein set forth.

In testimony whereof I affix my signature in presence of two witnesses.

WILLIAM WOOLGAR.

Witnesses:
 JAS. E. THOMAS,
 A. FRALICH.